United States Patent
Behen et al.

(10) Patent No.: US 8,904,823 B2
(45) Date of Patent: Dec. 9, 2014

(54) METHOD FOR OPERATING A GLASS MELTING FURNACE

(71) Applicant: AGC Glass Europe, Jumet (BE)

(72) Inventors: Johan Behen, Jumet (BE); Olivier Douxchamps, Jumet (BE)

(73) Assignee: AGC Glass Europe, Brussels (BE)

( * ) Notice: Subject to any disclaimer, the term of this patent is extended or adjusted under 35 U.S.C. 154(b) by 0 days.

(21) Appl. No.: 13/938,871

(22) Filed: Jul. 10, 2013

(65) Prior Publication Data

US 2013/0298609 A1    Nov. 14, 2013

Related U.S. Application Data

(62) Division of application No. 12/996,487, filed as application No. PCT/EP2009/056843 on Jun. 4, 2009, now abandoned.

(30) Foreign Application Priority Data

Jun. 5, 2008    (EP) .................................... 08104268

(51) Int. Cl.
*C03B 5/24*    (2006.01)
*C03B 5/235*    (2006.01)
*C03B 5/16*    (2006.01)

(52) U.S. Cl.
CPC ................ *C03B 5/16* (2013.01); *C03B 5/2353* (2013.01)
USPC ............................ 65/134.4; 65/134.1; 65/347

(58) Field of Classification Search
CPC .......... C03B 5/16; C03B 5/2353; F23D 14/32
See application file for complete search history.

(56) References Cited

U.S. PATENT DOCUMENTS

| 3,810,743 | A | * | 5/1974 | Rau et al. ............... 65/29.21 |
| 4,028,083 | A | * | 6/1977 | Patznick et al. ......... 65/29.21 |
| 5,632,795 | A | * | 5/1997 | Brown et al. ............... 65/157 |
| 5,655,464 | A |   | 8/1997 | Moreau et al. |

(Continued)

FOREIGN PATENT DOCUMENTS

| EP | 0 650 934 | 5/1995 |
| EP | 1 094 273 | 4/2001 |
| EP | 1 136 451 | 9/2001 |
| FR | 2 863 690 | 6/2005 |

OTHER PUBLICATIONS

Lievre, K., et al., "Recent developments in oxy-fuel firing for glass melters," Glass Industry, Glass Industry Magazine, vol. 82, No. 3, pp. 25-31, (Mar. 1, 2001).

(Continued)

*Primary Examiner* — Jason L Lazorcik
(74) *Attorney, Agent, or Firm* — Oblon, Spivak, McClelland, Maier & Neustadt, L.L.P.

(57) ABSTRACT

The present invention relates to a glass melting furnace, comprising a channel-shaped melting tank, the batch material being charged at an upstream end, the molten glass being recovered at the downstream end, said furnace being heated by means of burners, in which 80% of the combustion energy is produced by oxycombustion, oxygen being supplied continuously from a production plant located nearby or via a gas pipe from remotely located plants, characterized in that the furnace is fitted with oxygen storage means such that, should continuous supply cease, the furnace can operate at least in a temperature-maintaining mode for a maximum time of eight hours.

11 Claims, 2 Drawing Sheets

(56) References Cited

U.S. PATENT DOCUMENTS

| | | | |
|---|---|---|---|
| 6,101,847 A * | 8/2000 | Shamp et al. | 65/134.4 |
| 6,155,818 A * | 12/2000 | Joshi et al. | 431/12 |
| 6,454,562 B1 * | 9/2002 | Joshi et al. | 432/17 |
| 6,519,973 B1 * | 2/2003 | Hoke et al. | 65/134.4 |
| 6,524,097 B2 * | 2/2003 | Hoke et al. | 431/8 |
| 6,596,220 B2 * | 7/2003 | Gross | 266/44 |
| 6,705,118 B2 * | 3/2004 | Simpson et al. | 65/134.4 |
| 6,797,228 B2 * | 9/2004 | Gross | 266/44 |
| 6,818,176 B2 * | 11/2004 | Gross | 266/242 |
| 7,282,171 B2 * | 10/2007 | Gross | 266/44 |
| 7,509,819 B2 * | 3/2009 | Baker et al. | 65/346 |
| 7,581,948 B2 * | 9/2009 | Borders et al. | 431/158 |
| 8,696,349 B2 * | 4/2014 | Leroux et al. | 431/10 |
| 8,727,767 B2 * | 5/2014 | Watson et al. | 431/8 |
| 2001/0023053 A1 * | 9/2001 | Hoke et al. | 431/8 |
| 2002/0180122 A1 * | 12/2002 | Gross | 266/82 |
| 2002/0185791 A1 * | 12/2002 | Gross | 266/82 |
| 2002/0190442 A1 * | 12/2002 | Gross | 266/81 |
| 2003/0008255 A1 * | 1/2003 | Finke et al. | 431/215 |
| 2003/0037571 A1 * | 2/2003 | Kobayashi et al. | 65/134.4 |
| 2004/0046293 A1 * | 3/2004 | Gross | 266/221 |
| 2007/0042302 A1 * | 2/2007 | Ekman et al. | 431/75 |
| 2007/0141522 A1 * | 6/2007 | Borders et al. | 431/354 |
| 2007/0281254 A1 * | 12/2007 | Leroux et al. | 431/6 |
| 2010/0183990 A1 * | 7/2010 | Watson et al. | 431/8 |
| 2010/0291493 A1 * | 11/2010 | Jarry | 431/12 |
| 2011/0016923 A1 | 1/2011 | Douxchamps et al. | |
| 2011/0017195 A1 | 1/2011 | Douxchamps et al. | |

OTHER PUBLICATIONS

International Search Report issued Sep. 10, 2009 in PCT/EP09/056843 filed Jun. 4, 2009.

* cited by examiner

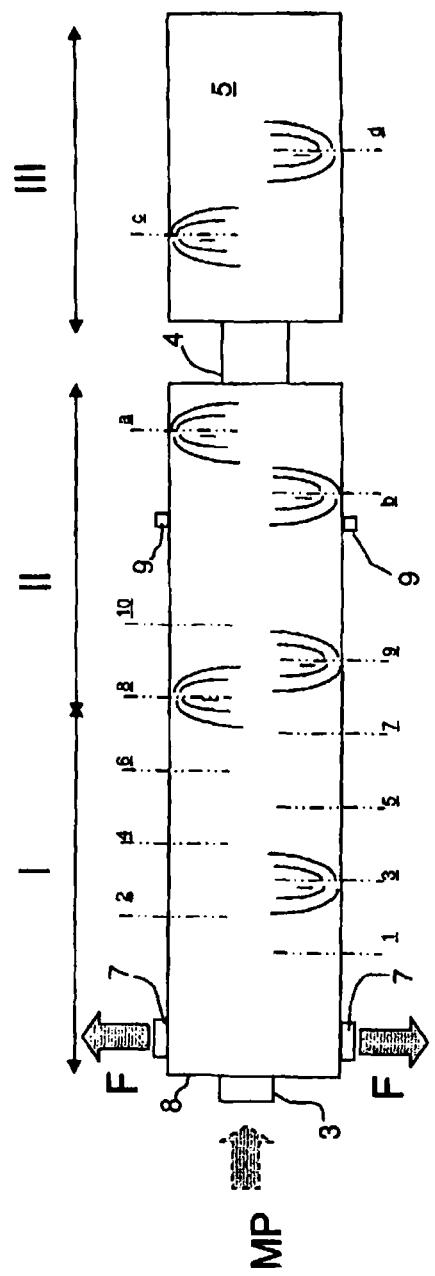

METHOD FOR OPERATING A GLASS MELTING FURNACE

This application is a Divisional of U.S. Ser. No. 12/996,487 filed Dec. 6, 2010, pending, which is a 371 application of PCT.EP09/56843 filed Jun. 4, 2009. The contents of each of these applications are incorporated herein by reference in their entirety.

The present invention relates to glass melting furnaces in which the melting energy is essentially produced by burners supplied with fuel and oxygen or a gas that is very rich in oxygen. These furnaces are usually referred to as "oxy-combustion" furnaces.

The secondary use of oxy-combustion burners is well known in glass melting furnaces. Thus, it is a matter of adding one or a limited number of oxy-combustion burners to furnaces operating with air in a traditional manner. The introduction of these additional burners is generally intended to increase the capacity of existing furnaces, possibly as their performance declines because of their age. It can also be to simply increase the capacity of a given furnace by introducing additional sources of energy.

The addition of some oxy-combustion burners to large-capacity furnaces is usually performed without any significant modification in the general operation of the furnace. In particular, the proportion of energy discharged from oxy-combustion remains low. It does not exceed 20% and very frequently does not exceed 10% of the total. For this reason, the continued supply of oxygen does not pose any significant risks to the plant. If the supply of oxygen is interrupted for whatever reason, the temperature of the furnace can be maintained by means of the only burners operating with air combustion. The output is possibly modified momentarily, but the plant is not put in danger.

Apart from having a supplementary source of energy, the systems operating in the so-called oxy-boosting mode are not able to benefit from all the known advantages that can result from oxy-combustion. A lower energy consumption and reduced emissions of undesirable fumes are among the potential advantages.

Moreover, the reduction of energy consumption per production unit in question has the advantage of restricting the carbon dioxide emissions and therefore meeting statutory requirements in this field.

The presence of nitrogen is also a source of the formation of so-called NOx oxides, the emission of which is forbidden in practice because of damage associated with the presence of these compounds in the atmosphere. The use of oxygen enables the problems associated with nitrogen in the air to be excluded, which is not the case with the oxy-boosting techniques.

Despite the advantages outlined above, the use of oxy-combustion in large glassmaking furnaces is yet to be developed. There are various reasons for this. Thus, the use of oxygen is necessarily more costly than that of air. However, the economic evaluation of using oxy-combustion is positive, particularly when a significant portion of the heat from the fumes is recovered as described in the unpublished European Patent Application 08 102 880. 5 filed on 25 Mar. 2008. Moreover, continuity of the operation requires supplying the oxygen without interruption.

In the case of large-capacity furnaces the necessary volume of oxygen is such that the most reliable supply is either by gas pipe or by a production plant in situ. Whatever mode is adopted, one problem is to ensure that the supply is permanent with consideration that a momentary interruption is always a possibility. However, in these circumstances the conditions that do not pose a risk to the plant must be maintained.

The invention relates to the methods for implementing the oxy-combustion technique in large glassmaking furnaces that form the subject of the claims attached to this description.

The first objective in the case of interruption to supply is to have means that allow the plant to be kept at temperature levels at which the molten glass remains in this state. For this, taking into consideration the significant and inevitable energy loss, a certain energy supply must be maintained in the furnace. Given that the plant is designed to operate using oxy-combustion, it is necessary to be able to supply energy according to this method using present means. The burners for oxy-combustion cannot be used like those for operation with air. The respective volumes of fuel are not in the same order of magnitude. The circuit and the pipe systems used with oxygen cannot be used for circulating air. For this reason, the thought is not to replace oxy-combustion with air combustion, except possibly in the case indicated further below for some burners located in the refining zone.

Therefore, to be able to supply the burners it is necessary to have an emergency source of oxygen available. Nevertheless, the difficulty lies in having a sufficient reserve available to cope with the momentary absence of supply. Considering the consumption in normal operating mode, the emergency stored volumes cannot be sufficient to assure full operation of the installation. According to the invention, to maintain these stores at a level where the cost is not prohibitive, the operation of the furnace is placed in slowed-down mode in the case of momentary stoppage of oxygen supply. The supply of energy is reduced strictly to a minimum to keep the glass molten. The furnace is no longer supplied with batch material and potential cooling sources are kept as far away as possible.

Given the type of assumed risk and commitments made by the oxygen suppliers, it must be possible to maintain the temperature of the furnace for a period of at least 8 hours. The quantity of oxygen stored on site at the plant must be sufficient to maintain this status at least for this period. Nevertheless, where possible, a higher quantity is preferably stored to better exclude any risk of supply failure that would exceed that which the suppliers presume to guarantee. It is advantageous to store a quantity of oxygen that corresponds to 20 hours of operation and preferably corresponds to 30 hours of operation.

The reduced supply of energy is intended to keep the glass present in the furnace in molten state, but is not intended to melt materials once again. In these conditions, the amount of energy necessary can be reduced significantly. Advantageously, the energy necessary does not represent more than a third of the energy consumed during the normal operating mode, with consideration of the inevitable losses.

In the temperature maintaining mode, the equilibrium of the furnace is greatly modified. The energy supply is distributed in a different manner to that during normal operation.

The molten material is distributed in different zones of the furnace: the melting, refining and conditioning zones. The supply of energy during normal operation is localised in the first two zones. The conditioning zone, which precedes the float bath, is intended to reduce the temperature of the glass to progressively bring it to sufficient viscosity. The absence of heating means above the conditioning zone does not allow the temperature to be maintained. To prevent the glass from setting, therefore, it is necessary to provide means to compensate for the absence of renewal of the molten glass material in this zone, said renewal alone assuring that the temperature is maintained in normal operating mode.

According to the invention, it is advantageous to provide emergency burners above the conditioning zone. These burners can be permanently installed or can be removable, in this case only being provided in case of need. The removable burners are advantageously arranged in the glory holes, which in normal mode allow evacuation of the hot atmosphere above the conditioning zone, thus promoting the desired cooling.

If these burners are removable, their mode of supply must be suited to this special feature. Because they must be put into operation quickly, they must have supply pipes that are easily connected. The connection to the supply circuit for fuel, whether liquid or gaseous, does not pose any particular difficulties. Conversely, this movable characteristic makes a supply of oxygen, particularly hot oxygen, a very delicate matter. For this reason, the emergency burners used above the conditioning zone are preferably burners that operate with air combustion. It must be noted that the benefit of using oxy-combustion is necessarily set aside in these emergency procedures. The presence of an air combustion section is not for the purpose of optimising the energy supply, but simply to maintain the temperature in the furnace.

The operation of the burners is arranged for an optimised system. Each burner operates in a power range that can vary within certain limits around a nominal reference power. To retain a good energy efficiency, it is not desirable to deviate too far from this range. Therefore, as a result of the reduction in energy supply, it is necessary to limit the number of active burners in the temperature maintaining mode.

The choice of burners that are kept active takes into consideration the specificities of oxy-combustion, but also of this particular mode of operation which no longer requires the melting of batch materials.

The oxy-combustion system, as described in the European Patent Application cited above, comprises a specific circulation of fumes inside the furnace. This circulation for the largest portion of the fumes is directed upstream of the furnace to benefit the transfer of energy to the zones of the furnace that require the largest supply.

Beyond the circulation of fumes, the majority of these collect for the purpose of recovering as much of the energy they carry as possible. This recovered energy is used in particular for preheating the oxygen and, if necessary, the fuels consumed.

The furnaces in question must also be substantially devoid of an atmosphere charged with nitrogen. For this reason, all the burners of the furnace mostly operate by means of oxy-combustion. However, while it is possible to retain a portion of the air combustion, the energy generated by oxy-combustion represents at least 80% of the total energy used in the furnace, and preferably at least 90% thereof.

Regardless of the constituents of the atmosphere of the furnace coming from the combustion, it is still necessary to prevent as far as possible the entry of external air in order to prevent an energy loss corresponding to the reheating of this air, but above all to prevent as far as possible the formation of undesirable NOx due to the passage of this air through the high temperatures of the flames (these temperatures are in the order of 1800° to 2300° C., depending on the type of oxygen burner chosen).

Irrespective of the envisaged designs, glassmaking furnaces cannot be kept perfectly sealed against the outside atmosphere. Moreover, to prevent the admission of ambient atmosphere, the circulation of fumes in the furnace is arranged so that it develops a dynamic seal.

It is not possible to fully modify the fittings of the furnace to take into account the specific conditions of the emergency mode. However, it is possible to select burners that are kept operative and those that are momentarily stopped.

In this particular system, the fumes continue to be directed upstream of the furnace but this is only to continue maintaining the energy recovery for heating the oxygen used. In normal operating mode, a limited portion of the fumes is extracted in the downstream section of the refining zone so that the restricted volume of air coming from the conditioning zone is evacuated with these fumes. The risk of nitrogen oxides forming is thus avoided. The purpose of maintaining the current of air coming from the conditioning zone is to prevent any entrainment of suspended dust in the atmosphere of the furnace.

In the emergency operating mode, the main concern is to maintain the temperatures. A momentary introduction of a little air into the furnace is tolerable. In these conditions, it is preferable according to the invention to ensure that all the fumes are evacuated upstream. On the one hand, the use of energy is best transmitted to the molten material, and on the other hand, even in the emergency mode when less fumes are discharged, the recovery of the heat therefrom is maintained at as high a level as possible, assuring conditions that allow the heating of the oxygen used in particular are maintained.

Since the supply of batch materials is interrupted, the amount of energy necessary in the upstream section of the furnace is much reduced. Even if the energy of the burners is reduced as indicated above, thermal equilibrium can be reached in this upstream section even if the first burners are not kept operative.

The distribution of the power by the choice of burners kept operative tends to make the temperatures of the melting and refining zones uniform. This distribution is also achieved in order to maintain as far as possible convection loops inside the bath. These flows, even when slowed down, continue to assure a reheating of the sections most exposed to cooling. This concerns the floor of the furnace in particular.

In general, to achieve this result the majority of the energy is supplied by the burners located in the central zone at the boundary of the melting and refining zones. Upstream, as indicated, the need for energy is lower than in normal operation. In contrast, in the absence of any flow of molten material towards the refining zone, it may be necessary in this zone, as well as in the conditioning zone, to provide burners in addition to those operating in normal operation.

Advantageously, if additional burners are provided in the refining zone, these burners also operate with oxygen to retain the benefit of oxy-combustion as far as possible. In the case where these burners are not installed permanently, the removable supply circuits are badly suited to the use of hot oxygen. The operation of these additional mobile burners in the refining zone is therefore preferably assured with oxygen that is not heated.

The choice of oxygen burners is all the more preferred as it assures that the temperatures are appropriately maintained in this zone of the furnace. Additional burners operating with air combustion that would be arranged to face existing glory holes would not enable the required temperatures to be appropriately maintained. The space requirement of the usual mobile burners means that these would cause the flame to develop in the thickness of the walls of the furnace. The heating of the crown in these conditions would only be assured by contact with the combustion gases. Their temperature is not sufficiently high to keep the crown at the desired values.

The arrangement of the air combustion burners, the flames of which would develop from the walls, is possible in principle. However, such an arrangement is not usual. It would require the removal of refractory elements from the walls of the furnace, an operation that is particularly inconvenient. Arrangement at the time of construction of emergency burners is also possible, but is not preferred for reasons of practicality.

While the burners intended for oxy-combustion are not usable like those for air combustion for the reasons indicated above, modifications to these burners allow an alternative operation, if necessary. It has been mentioned that the replacement of oxygen by air is not possible using the supply pipes of these burners. An alternative solution for these burners is to maintain the introduction of fuel and that of the so-called "primary" oxygen introduced with the fuel. This primary oxygen assures permanent ignition. The supplies of "secondary" and possibly "tertiary" oxygen, which represents the largest portion of the fuel and assures stepped combustion in the flame, are interrupted. Thus, instead air is introduced through appropriate conduits arranged in refractory blocks adjacent to the "primary" flame. The flames in these conditions develop well in the chamber of the furnace. Consequently, their radiation allows the crown to be maintained at adequate temperatures. However, the placement of these air supply pipes is a relatively difficult operation. For this reason, it is only undertaken if it is not possible to maintain the alternative modes described above.

In normal operating mode, the temperatures of the crowns of the furnace amount to between 1350° and 1450° C. Reducing the energy supply and maintaining the bath in molten state are accompanied by an appreciable decrease in temperature of these crowns. However, these temperatures remain elevated. In the melting and refining zones the temperature must preferably not be less than 1100° C.

In the conditioning zone the temperature in the normal operating mode is controlled to enable glass at about 1100° C. to be available when it is poured into the float bath. To reach these temperatures, not only are there no burners provided, but significant ventilation is maintained in order to progressively lower the temperature of the glass. In these conditions the temperature of the crown is appreciably lower than that in the melting and refining zones.

As indicated above, in the emergency mode it is necessary to supply energy to prevent the glass from setting. However, the crown temperature can be a little lower than that in the preceding zones. It must preferably not fall below 1050° C.

Convection loops are maintained in the normal mode of operation not only as a result of natural mechanisms caused by differences in the temperatures existing between the zones of the furnace, but also as a result of movements caused by supplementary means. These are, for example, bubblers, blenders or dams. What all these have in common, besides benefiting these convection movements, is to cause some cooling of the glass.

The blenders or dams, which are exposed to very aggressive conditions, must be permanently cooled during use. The objective is to minimise losses in the temperature maintaining mode. On this basis, the blenders are advantageously removed from the bath or their cooling is interrupted. Cooling is also interrupted for the dams, which are obviously not removable.

It is difficult to completely break off the supply of the bubblers arranged on the floor. Some flow of gas is maintained because these must be prevented from becoming blocked as a result of the glass setting. To limit the cooling associated with this introduction, the flow is reduced strictly to a minimum.

In practice, in the case of the oxy-combustion furnaces in question, the use of means for heating the bath by immersed electrodes is not envisaged, or if so to a very limited degree, e.g. in the charging zone for batch materials. In all cases the energy supply in normal operating mode does not exceed 5% of the total. These means are quite obviously independent of the supply of oxygen and for this reason can contribute to the energy supply for operation of the emergency mode.

To obtain an advantageous economic balance of large oxy-combustion furnaces, it is necessary to recover a significant portion of the heat contained in the fumes discharging from the furnace. In practice, as in the case of air combustion furnaces, the most economic use of this recovered energy lies in reheating the reagents introduced into the furnace: oxygen, fuel and possibly batch materials.

Heating the oxygen requires very strict precautions. The installations in which the oxygen circulates must be perfectly sealed, resistant to elevated temperatures and to the oxygen brought to these temperatures. The preheating of the oxygen is advantageously conducted in exchangers made from steels that have an excellent resistance to hot oxygen. Exchangers and materials suited to this use are described in the unpublished European Patent Application No. 07 107 942 filed on 10 May 2007. To minimise the risks associated with the movement of hot oxygen, various arrangements are proposed in the already cited European Patent Application No. 08 102 880.5.

In substance, two types of arrangements are proposed. Firstly, the transfer of energy is conducted in two stages. In a first stage, the fumes are passed into a recuperator and the transfer of energy occurs with an intermediate heat transfer fluid, e.g. air. In a second stage, the heat transfer fluid passes into an exchanger where it reheats the oxygen. Secondly, the exchangers heating the oxygen are located as close as possible to the burners to reduce the risks associated with corrosion. Seams and connections are avoided as far as possible in the same manner.

This system of recovery continues to operate in the reduced mode. The treatment is simply dedicated to heating the oxygen supplying the burners that are kept active.

In practice, to guarantee perfect operating reliability, it is preferred that the temperature of the oxygen is maintained at less then 650° C., preferably less than 600° C.

The fuel used is advantageously preheated whether it is natural gas or liquid fuel oil. In the case of natural gases, the preheating temperature is advantageously less than 650° C. and preferably less than 550° C. In the case of heavy fuel oils, the temperature is generally less elevated and does not exceed 180° C., and preferably does not exceed 150° C., to prevent the fouling that results from cracking of these fuels.

The invention is described in some detail below with reference to the sets of drawings:

FIG. 2 is a schematic plan view of the arrangements of FIG. 1 in emergency operating mode.

Figure 1:
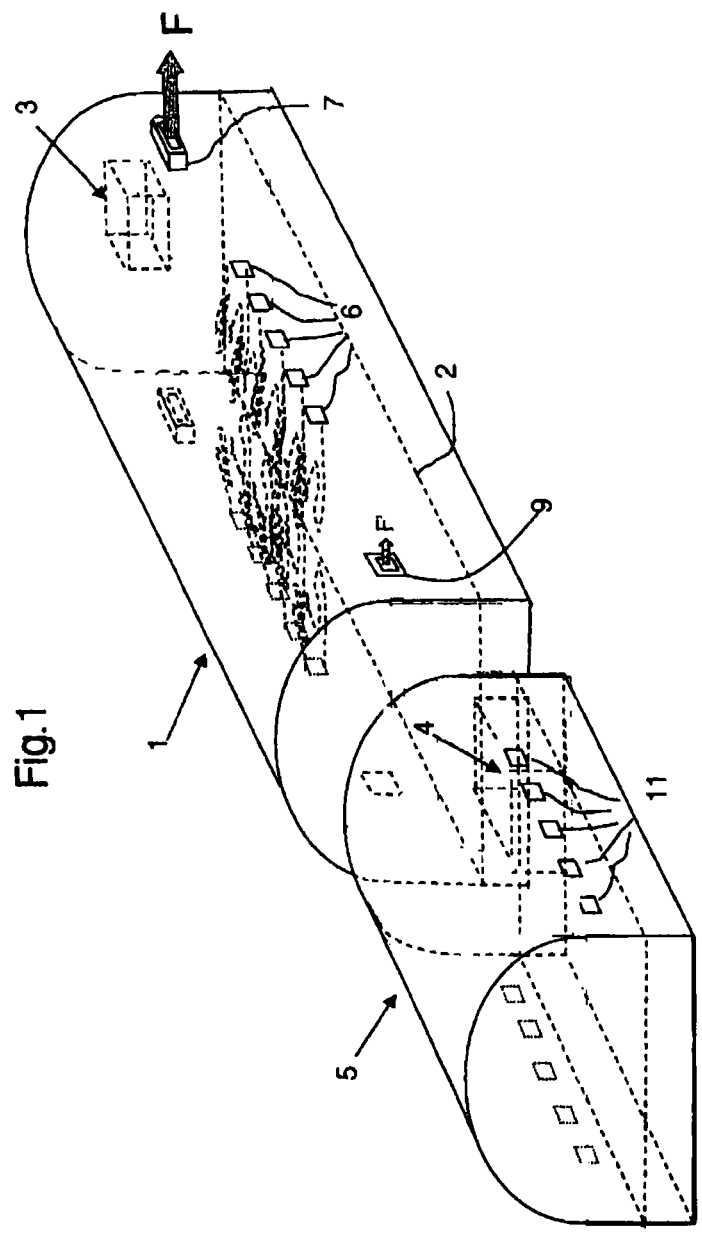
FIG. 1 is a schematic perspective view of a furnace according to the invention.

The furnace shown in FIG. 1 is of the type used in large-scale glass production operations such as those used to supply flat glass production using float glass techniques. Furnaces of this type continuously produce quantities of glass that can amount to as much as 1000 tonnes/day. To achieve these outputs the furnaces must have available power up to 60 MW.

The furnace 1 comprises a tank disposed in a closed chamber. The assembly is made from refractory materials resistant to temperatures, the corrosion of the fumes and the aggressive action of the molten materials. The bath level in the tank is shown by a broken line 2.

The furnace is supplied with batch materials at one of its ends. The opening, via which these batch materials are charged is shown schematically at 3. In practice, to facilitate distribution over the surface of the bath several charging points are usually provided. The molten glass exits at the opposite end via a neck 4 with a reduced width in relation to that of the tank. The base of the neck 4 is usually at the level of the floor of the furnace.

The neck is not completely immersed in the molten glass. There remains a space between the upper part of the neck and the surface of the strip of glass. The operating conditions relating to the gas flows in the furnace are regulated so that the atmosphere of the furnace does not pass into the neck in order to prevent any risk of suspended dust particles being entrained. To assure this operation, it is preferable to preserve a weak current of gas circulating contrary to the flow of the molten glass. Since the intention is only to prevent a current of gas in the reverse direction, this current is kept as weak as possible.

Burners, the placement of which is indicated at 6, are arranged along the side walls of the furnace on each side thereof to spread the flames over practically the entire width of the tank. The burners are spaced from one another in order to distribute the energy supply over a large portion of the length of this same melting and refining tank.

The combustion gases F are evacuated for the most part through the outlets 7 located close to the charging zone and at some distance from the closest burners. In the drawings (FIGS. 1 and 2), two outlets 7 are arranged symmetrically on the side walls, while the charging of batch materials (MP) is in the axis of the furnace. This is a preferred embodiment, but other arrangements are also possible such as e.g. the outlet of the gases in the wall 8 closing the furnace in its upstream portion. These outlets can also be distributed differently, but it is important to ensure that the fumes rise in counterflow to the flow of the glass V in the furnace. If necessary, the fumes can be at least partially output through the charging opening or openings.

As indicated above, according to the invention it must be ensured that the chamber of the furnace is virtually sealed against the penetration of outside air. The circulation of the fumes upstream prevents penetration on this side of the furnace. Any passages arranged in the side walls are also substantially sealed against the penetration of ambient air. In order to force back the small amount of air that can arrive in the conditioning section 5, a very restricted circulation of the fumes downstream of the furnace is advantageously arranged. These fumes F' are evacuated through the outlets 9.

The three zones of the furnace are indicated as I (melting), II (refining), III (conditioning) in FIG. 2.

The boundary between melting and refining is not generally embodied in the structure of the furnace. In particular, if a dam is arranged on the floor in these furnaces, this dam does not normally coincide with this boundary, even if it has a part in the conditions that lead to its positioning.

The distinction between the melting and refining zone is functional in all cases. It corresponds to the mode of circulation of the glass in the tank. This corresponds to a first convection loop in the melting section and a loop that rotates in the reverse direction to the first in the refining section. In the absence of any means directly influencing the circulation, the position of the boundary of the melting zone and the refining zone is determined by a collection of operating parameters that includes in particular the distribution of energy by the burners.

As a general rule, during normal operation, the supply of energy necessary for melting the batch materials is more significant than that which maintains the glass at temperature for refining. Consequently, the number of burners, and above all the power they deliver, is more significant in the melting zone.

According to the operating modes that prove most advantageous, the "heat curve", i.e. the distribution of the temperatures along the furnace, firstly progresses from upstream up to a central section close to the start of the refining zone. The temperature then varies a little decreasing slightly towards the neck 4 in preparation of the passage into the conditioning zone. For this reason, the downstream end of the furnace is normally devoid of burners.

The distribution of the burners is shown in FIG. 2 by the axis thereof. They are preferably arranged in staggered rows on either side of the tank to ensure that the flames emitted in opposite directions do not strike one another.

The conditioning zone 5 does not contain any burner in the normal operating mode. Openings 11 are arranged in the walls and ambient air is sent into the chamber 5 to bring the glass to a temperature compatible with its application on the float bath.

The operation in the temperature maintaining mode is illustrated in FIG. 2. Only one section of the burners is kept operative. In the example shown, the burners being numbered according to their position along the furnace starting from the charging zone, only burners 3, 8 and 9 of the ten burners, which are the burners permanently installed in the furnace, are active. The active burners are illustrated by the schematic representation of the corresponding flames.

The downstream end of the refining zone does not normally contain active burners. The flow of molten glass is sufficient to maintain the temperature conditions. In the emergency operating mode, the flow of glass is stopped. The end of the refining section therefore requires a supply of energy. In the embodiment shown, two additional burners a and b are temporarily arranged at locations prepared in advance in the walls of the furnace. Since the burners operate in the chamber that is changed to oxy-combustion, it is preferable to ensure that these burners are oxy-type burners. Their detachable nature makes the supply of hot oxygen very difficult. To assure all the required safety, the construction of the pipe systems and exchangers used for the movement of hot oxygen requires special features that are not very compatible with mobility. For these reasons, the oxy-burners a and b are preferably supplied with cold oxygen. However, in view of the temporary nature of the operation of these burners, it is possible to provide air burners. Thus, some of the advantages of oxy-combustion are suspended momentarily. In contrast, the use of air burners enables the consumption of oxygen to be reduced and, in the case of a given emergency reserve, thus enables the availability of this reserve to be extended.

In normal operating mode, the conditioning zone 5 does not contain any device for heating the glass. In the emergency mode it becomes necessary to supply the minimum amount of energy to keep the glass in molten state. Since no fumes are generated in the conditioning chamber, this likewise has no conduit for conveying these fumes out of this chamber. In these conditions, it is advantageous to choose air burners for the installed burners c and d. Once again a step is taken to avoid taking from the oxygen reserve, which is a reserve of necessarily limited volume. Moreover, the use of removable burners means that the positioning of the flame does not allow the crown to be heated to higher temperatures. However, in the conditioning section the temperature required is lower than in the melting and refining section. The use of these burners allows these temperatures to be reached.

The fumes F at the outlet of the furnace are used in devices intended for the recovery of a portion of the energy entrained by these fumes. Advantageously, this recovery serves to heat the oxygen of the burners. The most reliable system for heating oxygen comprises a double system of thermal exchange with an intermediate heat transfer fluid. The system in question described in the patent application cited above comprises a first exchange in a recuperator, the heat transfer fluid heated in this recuperator is then passed into an exchanger for heating the oxygen there and this is then conveyed to the burners.

Upon exit, the fumes are initially at temperatures in the order of 1200° to 1400° C. It is preferable to direct them into a recuperator, in other words a basic exchanger, which enables the temperature of the fumes to be lowered for their treatment before being discharged into the atmosphere. The heat transfer fluid, e.g. air, can be brought to a very high temperature, e.g. in the order of 800° C. This air is directed towards the exchangers to heat the oxygen. The temperature of the oxygen at the outlet of these exchangers can be as high as 600° C., but preferably does not exceed 550° C. The exchangers heating the oxygen are preferably in the immediate vicinity of the burners to minimise the path of the hot oxygen to its point of use.

In the emergency mode of operation, the circulation of the fumes remains essentially the same as in the normal mode. The fumes, while less abundant than in the normal mode, can again serve to heat a likewise reduced quantity of oxygen.

As an indication, in a furnace such as that shown in FIG. 1, the power supplied to obtain an output of 600 tonnes/day of glass is 60 MW. In the emergency mode of operation, the power supplied by burners 3, 8 and 9 is not more than about 7 MW. The two additional burners a and b in the refining zone add about 2.5 MW and the burners c and d located in the conditioning zone for their part supply 4 MW. In total the power is 13.5 MW, a little less than quarter of the operating power in the production mode. To supply the burners in oxy-combustion producing 9.5 MW, the oxygen necessary is in the order of 2000 Nm³/h. A reserve of liquid oxygen of 80 000 liters allows the furnace to be supplied for a period of as much as 30 hours, which is in principle much higher than that anticipated for the supplier to re-establish a sufficient supply. Otherwise, a supply via mobile tank must necessarily predominate.

The invention claimed is:

1. A method of operating a glass melting furnace, the method comprising an ordinary operating mode and a temperature maintaining mode, the ordinary operating mode comprising:
   introducing batch materials at an upstream end of a channel-shaped melting tank;
   recovering molten glass at a downstream end of the tank;
   heating the furnace by oxy-fueled burners so that at least 80% of combustion energy supplied to the furnace is by oxy-combustion;
   continuously supplying oxygen to the oxy-fueled burners from an oxygen production plant or via a gas pipe supplying oxygen from a remote location; and
   in the event of a cessation of the continuous supply of oxygen, operating the furnace in the temperature maintaining mode comprising:
      storing a quantity of oxygen on site sufficient to maintain operation in the temperature maintaining mode for a minimum period of eight hours;
      ceasing the introduction of batch materials;
      maintaining the batch materials and molten glass in a molten state in melting, refining, and conditioning zones of the furnace, and
      keeping the burners active such that crown temperatures in the melting and refining zones are not less than 1100° C. and crown temperatures in the conditioning zone are not less than 1050° C.

2. The method of operating a furnace according to claim 1, further comprising delivering power by the oxy-fueled burners in the temperature maintaining mode that is at most equal to one third of power delivered by the oxy-fueled burners during the ordinary operating mode.

3. The method of operating a furnace according to claim 2, further comprising operating only some of the burners for oxy-combustion during the temperature maintaining mode.

4. The method of operating a furnace according to claim 3, wherein the burners operating during the temperature maintaining mode are located so that fumes sweep over practically an entire surface of a bath before being evacuated.

5. The method of operating a furnace according to claim 1, further comprising in the ordinary operating mode and in the temperature maintaining mode, evacuating at least 65% of fumes upstream of the furnace in the vicinity of a location of charging of batch materials.

6. The method of operating a furnace according to claim 1, further comprising removing, or interrupting the cooling of, elements in contact with molten material that are normally cooled.

7. The method of operating a furnace according to claim 1, wherein when the furnace comprises bubblers, operating the bubblers at a minimum so that the bubblers are not blocked by setting of the molten glass or batch materials.

8. The method of operating a furnace according to claim 1, wherein the oxygen storage unit assures operation of the furnace at least in the temperature maintaining mode for a minimum period of at least 20 hours.

9. The method of operating a furnace according to claim 1, wherein the oxygen storage unit assures operation of the furnace at least in the temperature maintaining mode for a minimum period of at least 30 hours.

10. The method of operating a furnace according to claim 2, further comprising, in the temperature maintaining mode, operating at most half of the oxy-fueled burners.

11. The method of operating a furnace according to claim 1, further comprising, in the temperature maintaining mode, maintaining convection loops in the melting and refining zones.

* * * * *